United States Patent [19]

Marti

[11] 4,172,620
[45] Oct. 30, 1979

[54] AXLE-HUB ASSEMBLY

[76] Inventor: Milford F. Marti, 4001 Devon, Huntsville, Ala. 35802

[21] Appl. No.: 927,575

[22] Filed: Jul. 24, 1978

[51] Int. Cl.² .................. F16C 33/66; F16C 33/76
[52] U.S. Cl. .................................. 308/187; 301/114; 308/187.1; 308/211
[58] Field of Search ............. 308/187, 16, 187.1, 308/187.2, 191, 36.1, 210, 36.2, 211, 214; 301/114, 108 R

[56] References Cited

U.S. PATENT DOCUMENTS

| | | | |
|---|---|---|---|
| 2,657,104 | 10/1953 | Kayser | 308/211 X |
| 3,460,874 | 8/1969 | Johnson | 308/187 X |
| 3,642,327 | 2/1972 | Walther | 308/187 X |
| 3,649,080 | 3/1972 | Molinare | 308/187 X |

Primary Examiner—Douglas C. Butler
Attorney, Agent, or Firm—C. A. Phillips

[57] ABSTRACT

An axle-hub assembly for automotive vehicles in which lubrication is provided by a grease fitting position between a rear grease seal and a rear bearing.

3 Claims, 2 Drawing Figures

AXLE-HUB ASSEMBLY

BACKGROUND OF THE INVENTION

1. Field of the Invention

This invention relates to axle-hub assemblies for automotive vehicles, and particularly to a hub-axle assembly having improved means for lubrication.

2. General Description of the Prior Art

Many hub-axle assemblies for automotive vehicles, particularly those employed on towed vehicles, are constructed along rather standard lines, and wherein a stationary axle supports a pair of spaced bearings, which in turn support a hub. A conventional grease seal provides an essentially air-tight seal at the rear of the assembly, and a dust or grease cap encloses the front of the assembly. Typically, lubrication is effected by applying grease to a grease fitting in the dust cap. This system works reasonably well for most applications, but for boat trailers where hub-axle assemblies are frequently immersed, bearing failures have been all too numerous. Typically, when this has occurred, complaints by trailer owners to trailer manufacturers were relayed to hub-axle manufacturers, who would simply reply that there obviously had been a failure by the boat trailer owner to effect regular lubrication. However, as the complaints became more numerous, trailer manufacturers began to doubt this, and being caught in the middle, they commenced insisting on some system of correction of the problem by hub-axle manufacturers. As a hub-axle manufacturer, the inventor in this case determined to do something about the problem, and accordingly, its solution became the object of this invention.

SUMMARY OF THE INVENTION

In accordance with this invention, the applicant has determined that a basic problem has been that one simply could not reliably supply grease to a hub-axle assembly by applying grease to a grease fitting in the dust or grease cap. He found that so long as the rear grease seal held, did not destruct, trapped air largely between the front and rear bearings of the assembly prevented the filling of the central cavity of the assembly with grease, and thus there would remain a rather substantial air lock in the assembly and no grease would get back to the rear bearing. While this often was not too detrimental to hub-axle assemblies employed on a utility trailer, it was discovered that it was disasterous in the case of boat trailers. After considerable study, it was determined that in the case of boat trailers, the air in the hub-axle assembly would become heated during runs over land, temperatures often rising upward of 150° F., causing the density of air to decrease. Then when the axle assemblies were dumped in water, as is typically the case with boat launchings, the temperature suddenly would drop to typically around 70° F., and sometimes less. As a result, it was discovered that there occurred a sudden decrease in air pressure in the hub-axle assembly which caused water, mud, and other debris to be sucked into the assembly, diluting and washing grease out of the bearings and leaving the bearings to rust.

To solve the problem, the applicant determined to completely reverse the greasing method and to provide an essentially foolproof arrangement for assuring that not only were the bearings of a hub-axle assembly greased, but that the entire cavity from the rear grease seal through the rear bearing, into the center cavity, and through the front bearing to the dust cap were filled with grease, and by an arrangement wherein one could be assured that this was in fact the case.

Accordingly, a grease fitting was mounted in the hub of the assembly in the region behind the rear bearing and between the rear bearing and rear seal. In addition, a vent, and preferably a one-way or check valve, would be placed in the wall of the dust cap, enabling outward, not inward flow. Further, he determined that the grease seal should be made more air-tight and that in this application it should be of a type wherein sealing would be directed separately against dirt inflow and grease outflow since there would no longer be any high pressures which would tend to cause a higher incidence of seal failure by virtue of such selection.

DETAILED DESCRIPTION OF THE DRAWINGS

Figure 1:
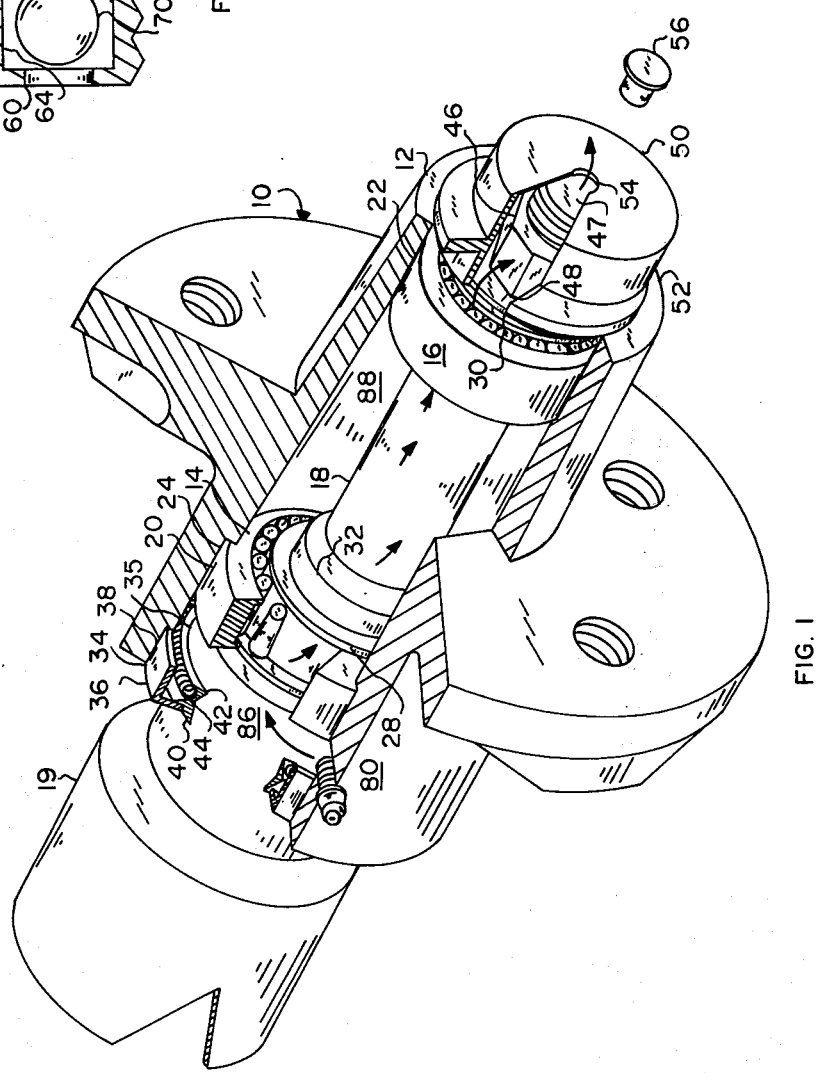
FIG. 1 is a cut-away pictorial view of a hub-axle assembly illustrating the invention.

Referring to FIG. 1, wheel support assembly 10 consists of hub 12 rotably supported by spaced bearing units 14 and 16 on spindle 18. Spindle 18 rigidly extends from the end of, and is axially aligned with, axle 19 which would typically include an identical wheel support assembly 10 on its opposite end (not shown). Outer races 20 and 22 of the bearing units are press fitted in appropriately sized recesses 24 and 26, respectively, in hub 12, and inner races 28 and 30 of these bearing units are positioned with a creep fit on a machined surface of spindle 18, such as machined surface 32. As shown, rear bearing unit 14 is of a larger diameter than front bearing unit 16, and the diameter of the spindle is appropriately sized to effect, as stated above, a creep fit.

The rear of assembly 10 is sealed by a compound, grease-dirt seal 34. The seal is formed of annular rubber member 35 having a Y cross section which is vulcanized to annular L cross sectioned metal support 36, the latter being held by a press fit into end recess 38 of hub 12. An outer extending lip 40 of seal 34 functions at an angle with respect to a plane normal to the axis of spindle 18 to block the entry of dirt and water into the assembly, and inner extending lip 42 functions as a grease seal, that is, a seal to prevent grease from escaping from the assembly. To enhance the latter function, lip 42 is reinforced with an encircling coil spring 44.

Figure 2:
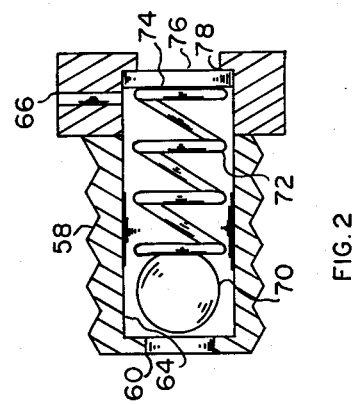
FIG. 2 is an enlarged cut-away view of a vent adapted to be mounted in a dust cap attachable to a hub.

As will be noted, both of the bearing units are of the tapered bearing type, and assembly 10 is held together by means of nut 46 on a threaded outer end region 47 of spindle 18, the nut applying a restraining force against bearing 16 through washer 48. The outer end of the assembly is sealed by a grease or dust cap 50 which is press fitted into end 52 of hub 12. Cap 50 includes a centrally located opening 54 which is adapted to receive a press fitted or threaded plug 56 (FIG. 1) or check valve 58, as shown in FIG. 2.

Check valve 58 has an opening 60 in end 62 which opens into a slightly larger, elongated passageway 64. There is also an opening 66 extending radially through the wall of check valve 58 near the opposite end 68 of the check valve. Opening 60 is normally sealed by virtue of sphere 70 being urged against it under pressure from spring 72, which is supported at its end 74 by disc 76 which covers an end opening 78 not functionally involved in the operation of the check valve. The purpose of check valve 58 is to permit flow from left to right (outward) through the check valve, but not from right to left, inward; and thus air, grease, or other matter may force, upon the injection of grease (which will be explained later), sphere 70 away from opening 60 against pressure from spring 72, allowing a passage through check valve 58. Thus, foreign matter may exit the cavity enclosed by cap 50, but none is allowed to enter.

The rear portion 80 of hub 12 is elongated, and thus provides sufficient space between seal 34 and rear bearing 14 for grease fitting 82 to be positioned in the wall of hub 12 and to have an exit inside the hub, which is clear of both grease seal 34 and rear bearing 14, which enables grease (indicated by arrows) to be freely injected into the space between rear seal 34 and rear bearing 14.

When grease is applied through grease fitting 82, it follows the path of least resistance, and thus first fully fills annular cavity 86 between rear bearing 14 and grease seal 34. Then, with the application of additional grease, grease pressure is uniformly distributed in cavity 86, and grease is uniformly forced through rear bearing 14 (fully lubricating it) into cavity 88, which exists between bearing units 14 and 16 and between spindle 18 and hub 12 in the central region of the assembly. After this cavity is filled, the addition of further grease produces an essentially uniform grease pressure annularly around the rear of front bearing unit 16, causing grease to uniformly be forced through it and into dust cap 50. Depending upon whether dust cap 50 is equipped with a simple plug 56 for opening 54 and the plug removed, or check valve 58 is used in opening 54, the application of any further grease through grease fitting 82 would cause grease to exit from dust cap 50, signifying that assembly 10 is fully greased. Afterward, plug 56 (if employed) would be replaced in opening 54.

The significant thing, of course, is that all spaces within assembly 10 have, in fact, been completely filled with grease and that there are no air pockets left which may change pressure and cause liquid or other foreign matter to be injested. This enables the lubricated state of the bearings to be maintained over long periods of time and despite repeated immersions in water.

Having thus described the invention, what is claimed is:

1. An axle-hub assembly comprising:
    an axle having a back, attachment end, and a front, free end, and including:
    front and rear bearings mounted at spaced positions along said axle;
    a hub forming a spaced, cylindrical housing around said axle and rotatably positioned on said bearings;
    a seal positioned around said axle between said rear bearing and said attachment end of said axle, and including means for providing a seal between said hub and said axle;
    a grease fitting positioned in and providing a passageway through said hub, said grease fitting being positioned between said rear bearing and said seal;
    a dust cap axially attached to a front end position of said hub and enclosing an end of said front bearing, and said dust cap having a small opening; and
    means for selectively closing said opening and said dust cap;
    whereby, by the application of grease through said grease fitting, grease initially fills the space between said rear bearing and said seal, is then forced through and thus lubricates the rear bearing, then fills the space formed between bearings and between axle and hub, is then forced through the front bearing, then fills the dust cap, and finally the excess is forced through said opening in said dust cap, indicating a complete greasing of the axle-hub assembly.

2. An axle-hub assembly as set forth in claim 1 wherein said means for selectively closing said dust cap comprises a one-way valve polarized to permit flow out of said dust cap, but blocking flow into said dust cap.

3. An axle-hub assembly as set forth in claim 1 wherein said seal comprises:
    a first annular, resilient and flexible, seal member supported by said hub and slidably engaging said axle, said seal member extending from said hub at an outward or rearward angle with respect to a plane perpendicular to said axle, whereby inflow to the hub is effectively blocked; and
    a second annular, resilient and flexible, seal member supported by said hub and slidably engaging said axle, said second seal member extending from said hub at an inward angle with respect to a plane perpendicular to said axle, whereby outflow from the hub is effectively blocked.

* * * * *